US009605559B2

(12) United States Patent
Truesdale et al.

(10) Patent No.: US 9,605,559 B2
(45) Date of Patent: Mar. 28, 2017

(54) WASH TIMING BASED ON TURBINE OPERATING PARAMETERS

(71) Applicant: General Electric Company, Schenectady, NY (US)

(72) Inventors: Alan Meier Truesdale, Greenville, SC (US); David Spencer Ewens, Greer, SC (US); Sidharth Abrol, Bangalore (IN)

(73) Assignee: General Electric Company, Schenectady, NY (US)

( * ) Notice: Subject to any disclaimer, the term of this patent is extended or adjusted under 35 U.S.C. 154(b) by 6 days.

(21) Appl. No.: 14/611,957

(22) Filed: Feb. 2, 2015

(65) Prior Publication Data
US 2016/0222820 A1    Aug. 4, 2016

(51) Int. Cl.
    *F01D 25/00* (2006.01)
    *F01D 21/10* (2006.01)
    *F02C 9/00* (2006.01)
    *F03B 15/00* (2006.01)
    *F03D 7/04* (2006.01)

(52) U.S. Cl.
    CPC .......... *F01D 25/002* (2013.01); *F01D 21/10* (2013.01); *F02C 9/00* (2013.01); *F03B 15/00* (2013.01); *F03D 7/047* (2013.01); *F05D 2220/31* (2013.01); *F05D 2220/32* (2013.01); *F05D 2240/12* (2013.01); *F05D 2240/35* (2013.01); *F05D 2260/81* (2013.01); *F05D 2270/05* (2013.01); *F05D 2270/11* (2013.01); *F05D 2270/303* (2013.01)

(58) Field of Classification Search
CPC ........... F05D 2260/821; F05D 2220/31; F05D 2220/32; F05D 2240/12; F05D 2240/35; F05D 2260/81; F05D 2270/05; F05D 2270/11; F05D 2270/303; F01D 25/002; F01D 21/10; F02C 9/00; F03B 15/00; F03D 7/047
See application file for complete search history.

(56) References Cited

U.S. PATENT DOCUMENTS 4,269,030 A    5/1981   Osborne
4,548,040 A    10/1985   Miller et al.
(Continued)

FOREIGN PATENT DOCUMENTS

EP            2664747 A2    11/2013
JP            10061412 A    3/1998
(Continued)

OTHER PUBLICATIONS

European Search Report and Opinion issued in connection with corresponding EP Application No. 16153233.8 on Jun. 10, 2016.

*Primary Examiner* — Michael D Lang
(74) *Attorney, Agent, or Firm* — Fletcher Yoder, P.C.

(57) ABSTRACT

A system may include a memory storing a turbomachinery degradation model configured to model degradation of a turbine system over time. Further, the system may include a controller communicatively coupled to the memory, which derives a turbomachinery wash timing based on at least one input signal from the turbine system and the turbomachinery degradation model. The turbomachinery degradation model may derive a desired wash point by estimating a modeled power of the turbine system, a modeled heat rate of the turbine system, or both. Furthermore, the controller may use the desired wash point to determine a time for washing components of the turbine system.

19 Claims, 3 Drawing Sheets

(56) References Cited

U.S. PATENT DOCUMENTS

| | | |
|---|---|---|
| 5,347,466 A | 9/1994 | Nichols et al. |
| 6,463,380 B1 | 10/2002 | Ablett et al. |
| 6,823,253 B2 | 11/2004 | Brunell |
| 6,823,675 B2 | 11/2004 | Brunell et al. |
| 7,392,713 B2 | 7/2008 | Barkhoudarian |
| 7,853,392 B2 | 12/2010 | Healey et al. |
| 7,941,281 B2 | 5/2011 | Rai et al. |
| 8,516,829 B2 | 8/2013 | Ewens et al. |
| 8,639,480 B2 | 1/2014 | Arnold et al. |
| 8,744,813 B2 | 6/2014 | Lacaille et al. |
| 8,862,433 B2 | 10/2014 | Yerramalla et al. |
| 2001/0056315 A1 | 12/2001 | Nagafuchi et al. |
| 2003/0100974 A1 | 5/2003 | Alvarez et al. |
| 2003/0131605 A1 | 7/2003 | Meisner |
| 2004/0030417 A1 | 2/2004 | Gribble et al. |
| 2004/0102872 A1 | 5/2004 | Schick et al. |
| 2004/0123600 A1 | 7/2004 | Brunell et al. |
| 2004/0176901 A1 | 9/2004 | Uluyol et al. |
| 2004/0237535 A1 | 12/2004 | Ainsworth |
| 2005/0222747 A1 | 10/2005 | Vhora et al. |
| 2005/0247064 A1 | 11/2005 | Lieuwen |
| 2006/0116847 A1 | 6/2006 | Plotts et al. |
| 2006/0195248 A1 | 8/2006 | Kim et al. |
| 2006/0217870 A1 | 9/2006 | Hoff et al. |
| 2006/0225403 A1 | 10/2006 | Tsuzuki et al. |
| 2006/0241910 A1 | 10/2006 | Petchenev et al. |
| 2007/0051111 A1 | 3/2007 | Uluyol et al. |
| 2007/0118270 A1 | 5/2007 | Wiseman et al. |
| 2007/0271898 A1 | 11/2007 | Little |
| 2008/0140352 A1 | 6/2008 | Goebel et al. |
| 2008/0201104 A1 | 8/2008 | Poncet et al. |
| 2008/0234994 A1 | 9/2008 | Goebel et al. |
| 2009/0012653 A1 | 1/2009 | Cheng et al. |
| 2009/0056335 A1 | 3/2009 | Myers et al. |
| 2009/0150040 A1 | 6/2009 | Rofka et al. |
| 2010/0031667 A1 | 2/2010 | Hoffmann et al. |
| 2010/0082267 A1 | 4/2010 | Schimert et al. |
| 2010/0089067 A1 | 4/2010 | Wilkes et al. |
| 2011/0054965 A1 | 3/2011 | Katagiri et al. |
| 2011/0137575 A1 | 6/2011 | Koul |
| 2011/0265487 A1 | 11/2011 | Gauthier et al. |
| 2012/0060505 A1 | 3/2012 | Fuller et al. |
| 2012/0072194 A1 | 3/2012 | Arnold et al. |
| 2012/0078567 A1 | 3/2012 | Ewens et al. |
| 2013/0024179 A1 | 1/2013 | Mazzaro et al. |
| 2013/0046507 A1 | 2/2013 | Vega Paez et al. |
| 2014/0257666 A1 | 9/2014 | Abrol et al. |

FOREIGN PATENT DOCUMENTS

| | | |
|---|---|---|
| JP | 10187211 A | 7/1998 |
| JP | 11182263 A | 7/1999 |
| JP | 5145966 B2 | 2/2013 |
| WO | 2011080548 A1 | 7/2011 |

WASH TIMING BASED ON TURBINE OPERATING PARAMETERS

BACKGROUND

The subject matter disclosed herein relates to turbine engines, and more specifically, to systems and methods for wash timing based on operating parameters of the turbine engines.

Turbine engines generally include a compressor, a combustor, and a turbine. The compressor compresses air from an air intake, and subsequently directs the compressed air to the combustor. In the combustor, the compressed air received from the compressor is mixed with a fuel and is combusted to create combustion gases. The combustion gases are directed into the turbine. In the turbine, the combustion gases flow against and around blades of the turbine, thereby driving rotation of the turbine and any external load. The external load may include an electrical generator. As the turbine engine operates, components may degrade and/or foul, resulting in reduced performance over the life of the system. The reduced performance may be in the form of reduced turbine engine output and/or efficiency and increased operating costs. To combat the reduced performance and the increased operating costs, the turbine may be washed upon an indication that the turbine engine output and/or efficiency has fallen below a determined level.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the claimed subject matter. Indeed, the claimed subject matter may encompass a variety of forms that may be similar to or different from the embodiments set forth below.

In a first embodiment, a system includes a memory storing a turbomachinery degradation model to model degradation of a turbine system over time. Further, the system may include a controller communicatively coupled to the memory, which derives a turbomachinery wash timing based on at least one input signal from the turbine system and the turbomachinery degradation model. The turbomachinery degradation model may derive a desired wash point by estimating a modeled power of the turbine system, a modeled heat rate of the system, or both. Furthermore, the controller may use the desired wash point to determine a time for washing components of the turbine system.

In a second embodiment, a method includes storing a turbomachinery degradation model in a memory. The turbomachinery degradation model models degradation of a turbine system over time. Additionally, the method includes receiving an input signal from one or more sensors, receiving a target power, and deriving a wash point using the turbomachinery degradation model and the target power. Further, the method includes determining whether the turbine system has reached the wash point based on the input signal and controlling the turbine system to enter a wash mode.

In a third embodiment, a controller includes at least one processor adapted to execute instructions. Further, the processor may cause the controller to access a turbomachinery degradation model stored in a memory, where the turbomachinery degradation model models degradation of a turbine system over time. The processor may also receive an input signal from one or more sensors, receive a target power, derive a wash point using the turbomachinery degradation model and the target power, and control the turbine system to a wash mode at the wash point.

BRIEF DESCRIPTION OF THE DRAWINGS

These and other features, aspects, and advantages of the present subject matter will become better understood when the following detailed description is read with reference to the accompanying drawings in which like characters represent like parts throughout the drawings, wherein.

DETAILED DESCRIPTION

Figure 1:
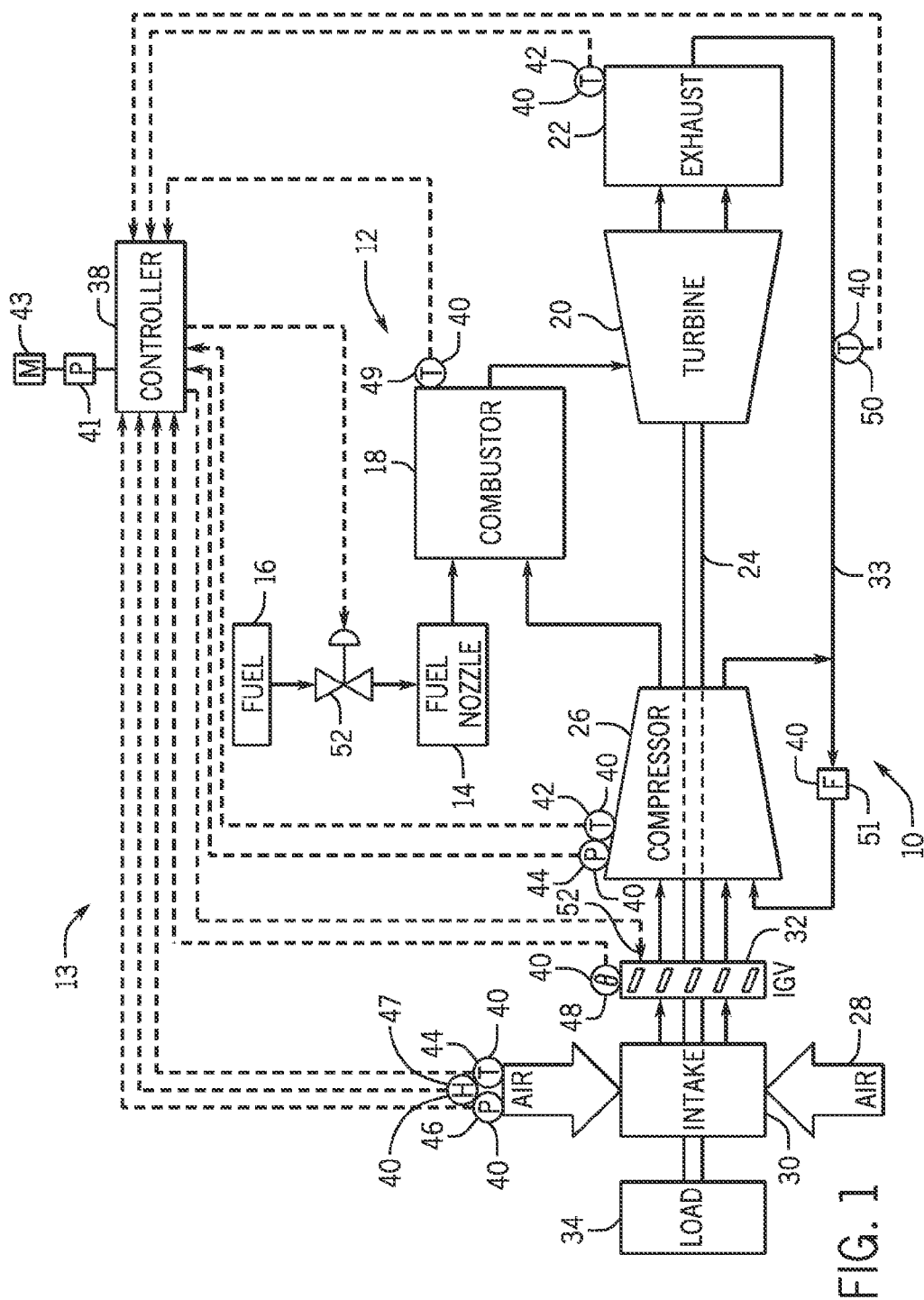
FIG. 1 illustrates an embodiment of a block diagram view of an embodiment of a turbine system.

One or more specific embodiments of the present subject matter will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present subject matter, the articles "a," "an," "the," and "said" are intended to mean that there are one or more of the elements. The terms "comprising," "including," and "having" are intended to be inclusive and mean that there may be additional elements other than the listed elements.

As discussed in detail below, the disclosed embodiments provide systems and methods for wash timing in turbine systems. In a new and clean state, a turbine engine typically produces the most favorable outputs (e.g., power outputs, efficiency, temperature, pressure, mass flow), which may be referred to as base output values. To preserve turbine engine efficiency and cost effectiveness, it may be desirable to maintain operation of the turbine engine at, or approximately at, the base output value(s) or some other desired target output value(s). For example, in some embodiments, an operating load may be maintained at a desired level to counter degradation effects by more optimally scheduling a wash. However, upon experiencing decreased efficiency of the turbine engine, it may be desirable to wash or otherwise clean a compressor portion, a turbine portion, an exhaust section, or any other component of the turbine engine that may increase efficiency of the turbine engine upon experiencing the wash. To determine a more optimized wash timing and/or schedule, at least one turbine engine operating parameter may be observed and/or modeled using the techniques described herein. The target output value(s) may be maintained or varied by adjusting at least one operating parameter of the turbine engine, and a model of the turbine engine may be adjusted based on adjustment of the at least one operating parameter. Further, a more optimal wash timing and/or scheduling of the turbine engine may be generated based on the model of the turbine engine as the model is adjusted.

For example, target output values for the turbine engine may include a target power output, a target heat rate, or a combination thereof. The power output of the turbine engine may be electrical power output created as the shaft rotates and may be measured in Megawatts (MW). The heat rate of the turbine is similar to an efficiency measurement, as it compares the energy value of fuel going into the turbine to power output by the turbine (e.g., heat rate is equal to the fuel flow rate multiplied by the fuel heating value and divided by the power output of the turbine). Further, adjustable control parameters may include a firing temperature control target, an exhaust temperature control target, a fuel flow rate, a fuel composition (e.g., one or more fuel types), a fuel heating value, an oxygen content of oxidant (e.g., air, oxygen enriched air, oxygen reduced air, or pure oxygen), a fuel-air ratio, a fuel temperature, an emissions flow rate, an inlet guide vane angle, another suitable parameter, or a combination thereof. In certain embodiments, the adjustments may be made using a prioritized list of objectives (e.g., fuel efficiency, target power, etc.). For example, if a wash of a turbine engine component is scheduled prior to more optimized wash times of other turbine engine components, the operating conditions of the turbine engine may be improved based on the prioritized list such that the output value exceeds the base output target value. Accordingly, the wash of the turbine engine component may occur after the adjustable control parameters have achieved their maximum adjustable level. This improvement may come at the expense of realizing the more optimized wash schedule of the other turbine engine components. In other embodiments, the power output by the turbine may be reduced to lengthen the wash schedule of certain components of the turbine and thus extend the time before lowering power output when washing the given turbine component(s). Indeed, a variety of prioritizations may be applied to increase system outputs, improve scheduling of washes, and so on.

Turning now to the drawings, FIG. 1 illustrates a block diagram of an embodiment of a turbine system 10 (e.g., turbomachinery) having a turbine engine 12. In some embodiments, the turbine system 10 may include a gas turbine, a steam turbine, a hydroturbine, and/or other similar turbine systems. As discussed below, the system 10 includes a control system 13 configured to monitor and control aspects of the turbine engine 12 to achieve multiple objectives, counter degradation/performance loss, and/or specifically maintain desired load output, heat rate, and/or various other outputs in response to monitored feedback. The turbine system 10 may use liquid or gaseous fuel, such as natural gas and/or a synthetic gas (e.g., syngas), to drive the turbine system 10. As depicted, in some embodiments, one or more fuel nozzles 14 may intake a fuel supply 16. Each fuel nozzle 14 then mixes the fuel with an oxidant (e.g., air) and may distribute the fuel-air mixture into a combustor 18. In certain embodiments, the fuel from the fuel supply 16 may be mixed with air prior to entering the turbine system 10 (e.g., pre-mixed fuel). Multiple combustors 18 may be arranged circumferentially about the turbine engine 12. Further mixing occurs between the fuel and air within the combustors 18. Although shown schematically as being outside or separate from the combustors 18, the fuel nozzles 14 may be disposed inside the combustors 18. The fuel-air mixture combusts in a chamber within the combustors 18, thereby creating hot, pressurized combustion gases. The combustors 18 direct the combustion gases through a turbine 20 and toward an exhaust outlet 22. As the combustion gases pass through the turbine 20, the gases force blades within the turbine 20 to rotate a shaft 24 along a longitudinal axis of the turbine system 10.

As illustrated, the shaft 24 is connected to various components of the turbine system 10, including a compressor 26. The compressor 26 also includes compressor blades coupled to the shaft 24. As the shaft 24 rotates, the compressor blades within the compressor 26 also rotate, thereby compressing air 28 from an air intake 30. The air intake 30 may feed the air 28 through a series of inlet guide vanes (IGVs) 32, which control the amount of air 28 that is conveyed into the compressor 26. In some embodiments, the air 28 may include a pre-mixed fuel, nitrogen, ambient air, other suitable fluids, or a combination thereof. The IGVs 32 may be disposed at an angle that can be increased or decreased to allow less or more air 28 into the compressor 26. Additionally, the turbine system 10 may include an adjustable inlet bleed heat (IBH) channel 33 that may be used to redirect a portion of the compressed air from an outlet of the compressor 26 and/or exhaust 22 to the inlet of the compressor 26. In certain embodiments, this redirected air may be somewhat warmer than ambient air taken in at the compressor 26. Accordingly, the redirected air may heat the ambient air and cause the air to expand thereby reducing the air allowed to flow through the system and enabling the turbine system 10 to operate at a part load with or without the assistance of an IGV 32 angle change. Additionally, in some embodiments using pre-mixed fuel, the IBH channel 33 may be used to dilute a concentration of fuel in the air 28. The shaft 24 may also be coupled to a load 34, which may be a vehicle or a stationary load, such as an electrical generator in a power plant or a propeller on an aircraft, for example. The load 34 may include any suitable device capable of being powered by the rotational output of turbine system 10.

The control system 13 may be used to control the operation of the turbine engine 12 to increase the operating efficiency or output power of the turbine system 10. For example, the control system 13 may be used to monitor and adjust various parameters of the turbine engine 12. Within the control system 13, a controller 38 may communicate with multiple sensors 40 to monitor aspects of the turbine engine 12. In certain embodiments, the controller 38 may include an industrial controller 38, such as a double or triple modular redundant (TMR) controller with 2, 3, or more processors 41. For example, the processors 41 may include general-purpose or application-specific microprocessors. Particularly, in some embodiments, the controller 38 may couple to any suitable computing device, such as a desktop computer or server. Likewise, a memory 43 communicatively coupled to the controller 38 may include volatile and/or non-volatile memory, random access memory (RAM), read only memory (ROM), flash memory, hard disk drives (HDD), removable disk drives and/or removable disks (e.g., CDs, DVDs, BluRay disks, USB pen drives, etc.), or any combination thereof. Additionally, in certain embodiments, the turbine system 10 may include a display (not shown). In some embodiments, the display may be integrated into (e.g., mobile device screen) or separate from (e.g., distinct monitor display) the controller 38. As discussed below, the display may be used to present information to a user that enables the user to select various objectives using a graphical user interface. Additionally, the turbine system 10 may include one or more input devices that receive selections of choices from one or more users. In certain embodiments, the input devices may include mice, keyboards, touch screens, trackpads, or other input devices for receiving inputs to the controller 38.

Regardless of the specific components, instructions stored on the memory 43 communicatively coupled to the controller 38 may be designed to carry out various monitoring, analysis, display menu functions, and control functions of the disclosed embodiments. In the depicted embodiment, the controller 38 may interact with various sensors 40, which may include an exhaust temperature sensor 42, an ambient air temperature sensor 44, an ambient air pressure sensor 46, an ambient relative humidity sensor 47, an IGV angle sensor 48, a firing temperature estimator 49, an IBH temperature sensor 50, and/or an IBH air flow sensor 51. In addition to or instead of sensors 40, models may be used to estimate measurable quantities based on one or more sensor inputs. Further, the controller 38 may interact with actuated valves 52, an IGV actuator, an IBH actuator, and/or other actuators to adjust operation of the turbine engine 12.

Figure 2:
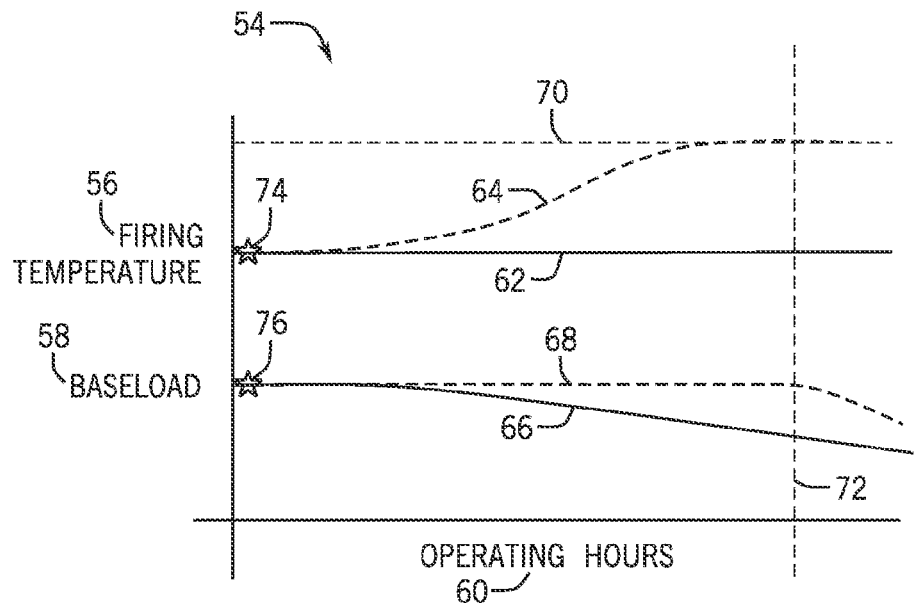
FIG. 2 is a graph showing embodiments of a firing temperature and a baseload output as a function of operating hours of the turbine system of FIG. 1.

Turning now to FIG. 2, a graph 54 represents a firing temperature 56 and a baseload power output 58 of the turbine engine 12. While the firing temperature 56 illustrated in FIG. 2 provides an example of a control parameter for the turbine system 10, it may be appreciated that the firing temperature 56 may also be replaced by any of the other control parameters mentioned above. As such, the firing temperature 56 may be adjusted during operation of the turbine system 10 to produce a constant target output of the turbine engine 12. For example, the graph 54 illustrates the firing temperature 56 and the baseload 58 over operating hours 60. The baseload 58 may be represented in Megawatts (MW) or any other acceptable form of power representation. Additionally, the firing temperature 56 may be represented in degrees Fahrenheit, Celsius, Kelvin, or any other acceptable form of temperature representation.

The firing temperature 56 is illustrated by two lines. A fixed firing temperature 62, indicated by a solid line, represents a fixed value of the firing temperature 56. For example, the turbine engine 12 may be controlled to operate at a constant temperature. In such a situation the firing temperature 56 remains constant, as illustrated by the fixed firing temperature 62. Additionally, a floating firing temperature 64, indicated by a broken line, may represent a floating temperature of the firing temperature 56. The floating firing temperature 64 may be adjusted based on maintaining a sustained output of the baseload 58. For example, as the compressor 26, or any other component of the turbine system 10, degrades, fouls, or both, the efficiency of the turbine system 10 may also degrade. Therefore, to maintain a constant output, the turbine engine 12 may be over fired to compensate for the degraded efficiency of the turbine system 10. The floating firing temperature 64 increases as the turbine engine 12 is over fired to compensate for the degrading efficiency of the turbine system 10.

Additionally, the graph 54 illustrates the baseload 58 with two lines. A degrading output 66, indicated by a solid line, illustrates the baseload 58 as the turbine engine 12 operates at a constant temperature (i.e., at the fixed firing temperature 62) over time. As the compressor 26, or any other component of the turbine system 10, degrades, fouls, or both, the baseload 58 will drop following the path of the degrading output 66. To combat the reduced efficiency of the turbine engine 12, parameters of the turbine engine 12 may be adjusted, such as using the floating firing temperature 64 discussed above, to maintain a sustained output 68. The sustained output 68 is illustrated as a broken line in the graph 54. Thus, as the floating firing temperature 64 increases, the baseload 58 maintains the sustained output 68.

Further, the floating firing temperature 64 may continue to increase until the floating firing temperature 64 approaches a maximum operating temperature 70. The maximum operating temperature 70 may be a preferred maximum temperature at which the turbine engine 12 is allowed to operate. Similarly, other control parameters may have a maximum output level resulting in a similar situation where altering the control parameters may no longer increase the output of the turbine engine 12. For example, altering the fuel-air ratio may only increase output to a certain level before the output increase may taper off or even result in the output decreasing.

Upon the floating firing temperature 64 reaching the desired maximum operating temperature 70, the sustained output 68 may no longer maintain a constant output. The timing for such a situation may occur at a more optimized wash point 72. The more optimized wash point 72 may be calculated by measuring an instance where the sustained output 68 no longer maintains a constant output, by measuring when the floating firing temperature 64 reaches the maximum operating temperature 70, or both. Further, once the turbine system 10 reaches the number of operating hours 60 at which the more optimized wash point 72 occurs, the turbine system 10 may undergo a wash mode to recapture some of the lost efficiency due to degradation, fouling, or both, in the components of the turbine system 10. Therefore, the wash mode may attempt to return the floating firing temperature 64 to a clean firing temperature 74 and the sustained output 68 to a clean output 76.

It may be appreciated that the more optimized wash point 72 may be adjusted before or after the wash mode based on efficiency loss of the turbine system 10. For example, over time, the turbine system 10 may not maintain the target output for extended periods of time, or the output of the turbine system 10 may decrease dramatically when the firing temperature reaches the maximum operating temperature 70. In such situations, it may be desirable to adjust the wash point 72 to a point that occurs prior to the point where the target output is no longer maintained. Similarly, it may also be desirable to adjust the wash point 72 to a modeled point modeling a predicted time at which the target output is no longer maintained. This modeled point may be based on a turbomachinery degradation model and historical data of the turbine system 10. In this manner, the turbine system 10 may be proactively adjusted to avoid losing the target output of the turbine system 10 instead of reacting to actually losing the target output of the turbine system 10.

Moreover, at the wash point 72, the turbine system 10 may have several options for entering the wash mode. For example, components of the turbine system 10 may be washed either online or offline. In an online wash, water may be injected into a component of the turbine system 10 while the turbine engine 12 is still running. Initially, the turbine engine 12 may be operating below the baseload 58, but the online wash occurs while the turbine engine 12 maintains some form of output, albeit possibly less than the baseload 58. The online wash may occur hourly, daily, monthly, quarterly, or at any other recurring time frame depending on preferences of an operator of the turbine system 10. Typically, however, the online wash may be limited to once per day while the turbine engine 12 remains online. By limiting the number of times the online wash may occur, the operator may also limit the amount of reduced output that the turbine system 10 may experience.

An offline wash may involve a shutdown of the turbine engine 12 and subsequent cooling. Once the turbine engine 12 is cooled, water may be injected into one or more of the components of the turbine system 10. Removing the turbine engine 12 completely from the baseload 58 may enable a more thorough wash of the components, but the downtime of the turbine system 10 may exceed downtime resulting from the online wash. For example, the turbine system 10 may remain down from 8 to 24 hours depending on the thoroughness of the wash, the number of component receiving the wash, and a particular turbine system 10 that is washed. As such, an offline wash may occur less frequently than the online wash (e.g., quarterly, yearly, biennially, or at any other recurring time frame depending on the degradation rate of the turbine system 10 and on preferences of an operator of the turbine system 10).

In one example, a high-pressure wash may be accomplished manually so that heavy carbonaceous deposits may be sand-blasted, and components of the turbine system 10 may also be hand scrubbed. Manual cleaning methods may increase recapture of the lost efficiency, but the manual cleaning methods may come at the expense of increased man-hours and increased downtime of the turbine system 10. In another example, the high-pressure wash may be accomplished automatically. Automatic high-pressure washing may include spraying high-pressure washing materials into one or more of the components of the turbine system 10. Further, the washing materials may include water, abrasive materials (e.g., sand), cleaning solutions, and the like, or any combination thereof.

To determine whether an online or an offline wash is more appropriate, the controller 38 may receive data from the sensors 40 to derive when the wash point 72 occurs and compare intervals between previous washes. For example, if the turbine system 10 reaches the wash point 72 rapidly after a previous wash, the controller 38 may determine that an offline wash should occur to more aggressively recapture some efficiency lost by the turbine system 10. On the other hand, if the wash point 72 is reached relatively long after the previous wash, then the controller 38 may determine that an online wash is appropriate to limit downtime of the turbine system 10. Therefore, in addition to the wash point 72, the controller 38 may take into account resource efficiency, economic considerations, cost accounting, and so on, to determine an appropriate wash mode for the turbine system 10.

Figure 3:
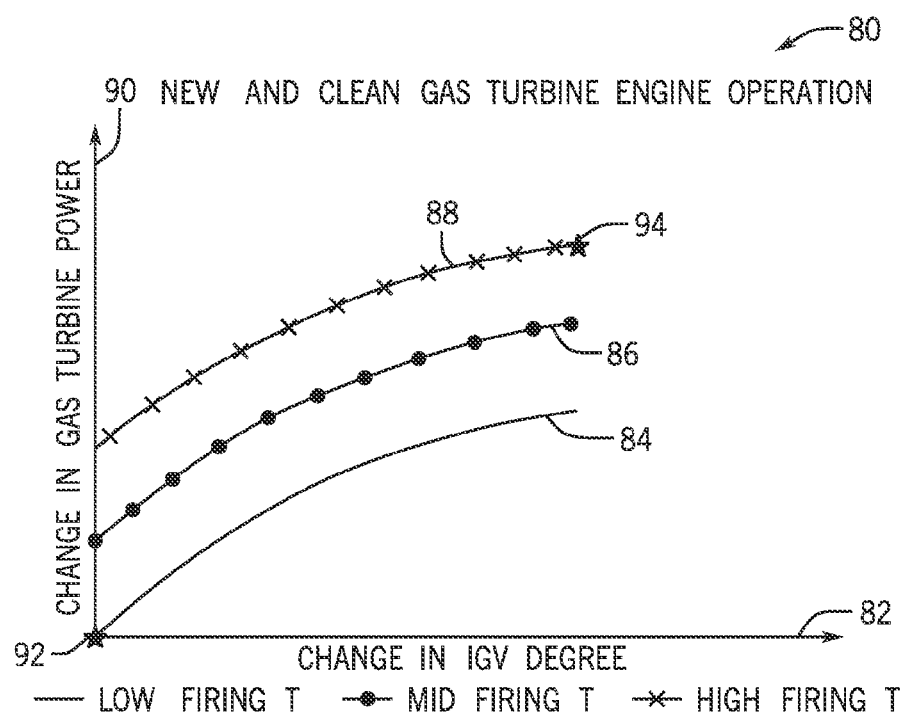
FIG. 3 is a plot showing embodiments of a change in gas turbine power as a function of change in inlet guide vane (IGV) degree and firing temperature.

FIG. 3 illustrates an embodiment of a plot 80 depicting change in the power output of the turbine engine 12 as a function of change in the degree or angle of the IGVs 32 and the firing temperature 56 in a new and clean gas turbine engine 12. The plot 80 depicts how changes in the angle of the IGVs 32 and the firing temperature 56 within the combustor 18 may affect the power output of the turbine engine 12. The data points of the plot 80 may form a model with which to compare live data of the turbine engine 12. The comparison may form at least part of a basis for determining the more optimized wash point 72. Additionally, over time, the live data of the turbine engine 12 may be used to adjust the model to more accurately depict a specific turbine engine 12 or a specific turbine system 10.

In the plot 80, the x-axis 82 represents a first variable (e.g., operating condition), namely change in the angle of the IGVs 32, with the change in angle increasing toward the right end of the x-axis 82 (e.g., the IGVs 32 are more open toward the right, increasing air flow). The second variable (e.g., operating condition), namely change in firing temperature, is shown with a series of lines within the plot 80. A plain line 84 represents a low firing temperature 56, a dotted line 86 represents a mid firing temperature 56, and a line marked with x's 88 represents a high firing temperature 56. A y-axis 90 represents the resultant change in turbine engine 12 power output as a factor of the variables.

The plot 80 exhibits a trend for the power output of the turbine engine 12 with respect to the variables. For example, as the change in the angle of the IGV 32 increases (e.g., as the IGVs approach the fully-open position), the power output supplied by the turbine engine 12 increases. Similarly, as the firing temperature in the combustor 18 increases, the power output of the turbine engine 12 increases. Thus, opening the IGVs 32 and increasing the firing temperature within the combustor 18 may be effective methods of counteracting degradation of the turbine engine 12 over time in an effort to maintain power output.

It may be desirable to note certain points on the plot 80. Particularly, points 92 and 94 represent certain values to note with respect to operation of the turbine engine 12. Point 92 corresponds to a base firing temperature 56 and a base angle of the IGVs 32, indicating a base output value (e.g., the turbine engine 12 power or efficiency) of the turbine engine 12 when it is initially operated in a new and/or clean condition. Point 94 corresponds to a high firing temperature 56 and a large change in the angle of the IGVs 32, resulting in an increased power output potential for the turbine engine 12 in a new and clean state. Generally, as the turbine engine 12 operates throughout its product life, the variables (e.g., operating conditions) may be adjusted in any combination to utilize this power potential to counteract the power loss due to degradation and/or fouling of the gas turbine engine 12. Further, additional operating conditions may be adjusted, as previously described.

Data points representing the plot 80 may be stored as a model within the memory 43 communicatively coupled to the controller 38. In one embodiment, the controller 38 may compare a live output of the turbine system 10 as it operates using known operating parameters of the turbine system 10 (e.g., the firing temperature 56 and/or the angle of the IGVs 32) with data points of the model stored within the memory 43 at the same known operating parameters. Using this comparison, the controller 38 may determine if the turbine system 10 has reached the more optimized wash point 72. Further, in another embodiment, the controller 38 may compare live engine data to historical engine data stored within the memory 43 communicatively coupled to the controller 38 to determine the more optimized wash point 72. In this embodiment, the more optimized wash point 72 may be determined by the controller 38 based on a threshold that the live engine data may surpass when comparing the live engine data to the historical engine data. For example, when the live engine data reaches a certain output, a certain heat rate at a certain firing temperature, and/or a certain angle of the IGVs 32 that has historically indicated that the turbine system 10 has reached the more optimized wash point 72, the controller 38 may likewise determine that the turbine system 10 has reached an optimal time for washing components of the turbine engine 12.

Figure 4:
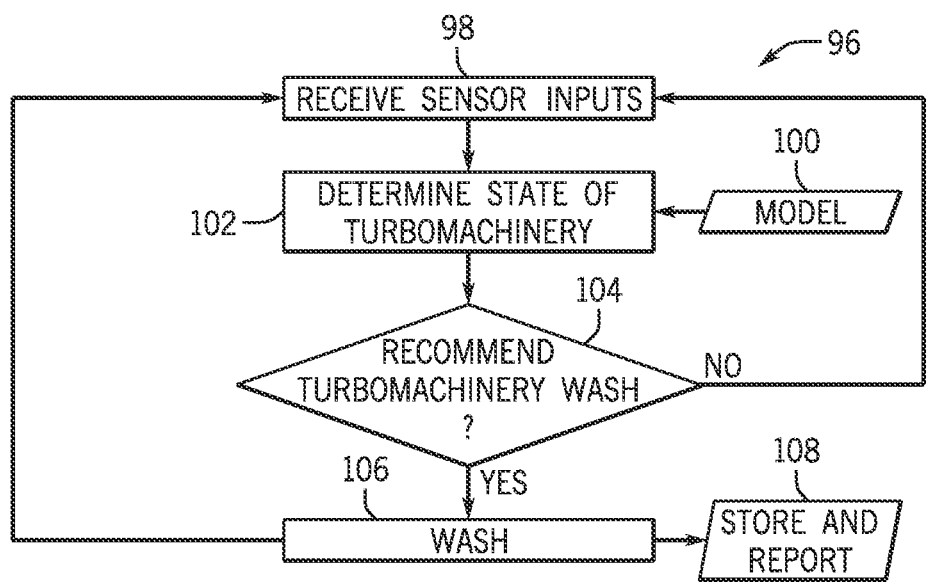
FIG. 4 is a flow diagram of an embodiment of a method for determining wash timings for components of the turbine system of FIG. 1.

FIG. 4 is a flow diagram of an embodiment of a process 96 for determining the more optimized wash point 72 of a turbine system 10. In certain embodiments, the process 96 may be implemented as instructions or code stored on the memory 43 communicatively coupled to the controller 38 and executable by the processor 41 of the controller 38.

Thus, each step of the process 96 may include such instructions or code, and may also employ sensor feedback, mathematical algorithms, computer/mathematical models, historical data and trends, look-up tables, knowledge based data, expert data, market/pricing data, etc. For example, if the output of the turbine engine 12 begins to degrade despite increasing operating parameter values to increase output, the controller 38 may instruct the turbine system 10 to enter a wash mode. The controller 38 may make this determination based off of the live engine 12 data produced by the turbine system 10 compared to historical data of the turbine system 10 or models of predicted engine 12 data stored within the memory 43 communicatively coupled to the controller 38. Further, in some embodiments, the process 96 may be utilized by the operator of the turbine engine 12 to simply adjust a wash schedule based on an increased customer demand, such as a power demand, real time pricing of electricity, outages of other power plants, etc. Alternatively, the process 96 may be employed to extend the product life of the turbine engine 12 to postpone an outage. In such an embodiment, the turbine engine 12 may be controlled to enter the wash mode more frequently to recover as much degradation as possible. For example, if the turbine engine 12 is scheduled for an offline wash a few weeks prior to an entire plant outage, components of the turbine engine 12 may be washed online daily to extend the useable life of the turbine engine 12 to equal that of the entire plant.

The turbine system 10 may originally receive inputs from the sensors 40 disposed around various components of the turbine system 10 at the controller 38 (block 98). As discussed above, the sensors 40 may include the exhaust temperature sensor 42, the ambient air temperature sensor 44, the ambient air pressure sensor 46, the ambient relative humidity sensor 47, an IGV angle sensor 48, a firing temperature estimator 49, the IBH temperature sensor 50, and/or the IBH air flow sensor 51. Further, the information provided by the sensors 40 provides data to determine a live status of the turbine system 10.

Subsequently, the state of the turbine system 10 may be determined by comparing the live status of the turbine system 10 to a turbomachinery degradation model 100 (block 102). The turbomachinery degradation model 100 may be stored within the memory 43 communicatively coupled to the controller 38, and the turbomachinery degradation model 100 may represent heuristic data of the turbine system 10, a physics-based data of the turbine system 10, a statistics based data of the turbine system 10, or the turbomachinery degradation model 100 may simply be a threshold point that indicates that the turbine system 10 has reached the more optimized wash point 72 when the live data falls below the threshold point. For example, the turbomachinery degradation model 100 may estimate a modeled power of the turbine system 10, and/or the turbomachinery degradation model 100 may estimate a modeled heat rate of the turbine system 10. From the modeled power and the modeled heat rate, the turbomachinery degradation model 100 may determine the more optimized wash point 72. Further, the turbomachinery degradation model 100 may also adjust over time based on at least one input signal from the turbine system 10. For example, the degradation model 100 may dynamically adjust based on input signals specific to a turbine system 10 as the turbine system 10 is actually implemented.

Once the state of the turbine system 10 is determined, the controller 38 may make a wash recommendation for the components of the turbine system 10 (block 104). The recommendation may be made to wash if the controller 38 determines that the live data of the turbine system 10 reached the more optimized wash point 72, as discussed in detail above. Further, if the live data of the turbine system 10 has yet to reach the more optimized wash point 72, the controller 38 may restart the process 96 at block 98.

Should the determination at block 104 be that a wash is recommended, the turbine system 10 may enter the wash mode (block 106). In the wash mode, components of the turbine engine 12 may be washed online or offline, as discussed in detail above. The determination of washing online or offline may be made by the controller 38 based on several factors such as timing between washes, type of wash that occurred immediately preceding the present wash, present consumer energy demand, and the like. For example, if the consumer energy demand is elevated, as in summer months, the controller 38 may instruct the turbine system 10 to provide an online wash to minimize downtime of the turbine system 10.

Upon completion of the wash mode at block 106, the data from the wash mode, such as type of wash, timing of wash, and live data of the turbine system 10 immediately prior to the wash, may be stored and reported (block 108). This data may be implemented to adjust the turbomachinery degradation model 100 for future determinations of whether the turbine system 10 has reached the more optimized wash point 72, or the data may be used for future determinations of whether an online wash or an offline wash is desired. Additionally, upon completion of the wash mode at block 106, the controller 38 may restart the method 96 at block 98.

One or more of the disclosed embodiments, alone or on combination, may provide one or more technical effects including extending an operational life of the components of the turbine system 10 and reducing planned or unplanned downtime of the turbine system 10. The technical effects and technical problems in the specification are exemplary and are not limiting. It should be noted that the embodiments described in the specification may have other technical effects and can solve other technical problems.

This written description uses examples to disclose the subject matter, including the best mode, and also to enable any person skilled in the art to practice the subject matter, including making and using any devices or systems and performing any incorporated methods. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
a memory storing a turbomachinery degradation model configured to model degradation of a turbine system over time; and
a controller communicatively coupled to the memory and configured to derive a turbomachinery wash timing based on at least one input signal from the turbine system and the turbomachinery degradation model, wherein the turbomachinery degradation model is configured to derive a desired wash point by estimating a modeled power of the turbine system, a modeled heat rate of the turbine system, or both, and wherein the controller is configured to use the desired wash point to determine a time for washing components of the turbine system and control the turbine system to operate in a clean mode by controlling an injection of water into the turbine system when the time for washing the components of the turbine system is surpassed, wherein the controller is configured to derive the desired wash point by measuring when a sustained power output of the turbine system no longer maintains a constant output.

2. The system of claim 1, wherein the controller is configured to maintain a steady output of the turbine system, a steady heat rate of the turbine system, or both over time until the time for washing the components of the turbine system is surpassed.

3. The system of claim 1, wherein the clean mode comprises driving the turbine system offline for cleaning.

4. The system of claim 1, wherein the at least one input signal comprises a firing temperature, an inlet guide vane (IGV) angle, a combustor temperature rise, an exhaust temperature, or a combination thereof.

5. The system of claim 1, wherein the turbomachinery degradation model is configured to derive the wash point by estimating the modeled power and estimating a modeled firing heat of the turbine system.

6. The system of claim 1, wherein the turbomachinery degradation model is configured to adjust over time based on the at least one input signal from the turbine system.

7. The system of claim 1, wherein the turbomachinery degradation model comprises a physics-based model, a statistical model, a heuristic model, or a combination thereof.

8. The system of claim 1, wherein the turbine system comprises a gas turbine, a steam turbine, a hydroturbine, a wind turbine, or a combination thereof.

9. The system of claim 1, comprising a sensor communicatively coupled to the controller and configured to transmit the at least one input signal, and wherein the at least one input signal is representative of a measured power, a measured heat rate, or a combination thereof.

10. A method, comprising:
storing a turbomachinery degradation model in a memory, wherein the turbomachinery degradation model is configured to model degradation of a turbine system over time;
receiving an input signal from one or more sensors;
receiving a target power;
deriving a wash point using the turbomachinery degradation model and the target power wherein the deriving the wash point comprises measuring when a sustained power output of the turbine system no longer maintains a constant output;
determining whether the turbine system has reached the wash point based on the input signal; and
controlling the turbine system to enter a wash mode.

11. The method of claim 10, comprising adjusting the turbomachinery degradation model based on the input signal from the one or more sensors.

12. The method of claim 10, wherein the wash mode comprises an online wash or an offline wash of components of the turbine system.

13. The method of claim 12, wherein the offline wash comprises removing the turbine system from the baseload and allowing the turbine system to cool.

14. The method of claim 12, wherein the online wash and the offline wash comprise injecting water into a compressor of the turbine system.

15. A controller, comprising:
at least one processor adapted to execute instructions configured to cause the controller to:
access a turbomachinery degradation model stored in a memory, wherein the turbomachinery degradation model is configured to model degradation of a turbine system over time;
receive an input signal from one or more sensors;
receive a target power;
derive a wash point using the turbomachinery degradation model and the target power wherein the instructions cause the controller to derive the wash point by measuring when a sustained power output of the turbine system no longer maintains a constant output; and
control the turbine system to enter a wash mode at the wash point.

16. The controller of claim 15, wherein the input signal comprises a firing temperature, an inlet guide vane (IGV) angle, a combustor temperature rise, an exhaust temperature, or a combination thereof.

17. The controller of claim 16, wherein deriving the wash point comprises adjusting the wash point based on changes in efficiency of the turbine system.

18. The controller of claim 15, turbine system comprises a turbine engine, wherein the wash mode comprises an online wash where the turbine engine continues operations or an offline wash where the turbine engine is stopped and allowed to cool.

19. The controller of claim 15, wherein the instructions are configured to adjust the turbomachinery degradation model based on the input signal from the one or more sensors.

* * * * *